(12) United States Patent  
Miyake

(10) Patent No.: US 7,215,964 B2
(45) Date of Patent: May 8, 2007

(54) ASYMMETRIC RADIO ACCESS NETWORK, AND ASSOCIATED METHOD, FOR COMMUNICATING DATA AT HIGH DATA RATES

(75) Inventor: Masayasu Miyake, Tokyo (JP)

(73) Assignee: Nokia Corporation, Espoo (FI)

( * ) Notice: Subject to any disclaimer, the term of this patent is extended or adjusted under 35 U.S.C. 154(b) by 631 days.

(21) Appl. No.: 10/456,993

(22) Filed: Jun. 6, 2003

(65) Prior Publication Data

US 2005/0003825 A1 Jan. 6, 2005

(51) Int. Cl.
*H04Q 7/20* (2006.01)
*H04B 7/14* (2006.01)
*H04B 7/00* (2006.01)

(52) U.S. Cl. ............... 455/452.2; 455/15; 455/455; 455/516

(58) Field of Classification Search ............ 455/15, 455/452.2, 455, 516, 517, 522, 560, 562.1
See application file for complete search history.

(56) References Cited

U.S. PATENT DOCUMENTS

| 4,819,227 | A | * | 4/1989 | Rosen | 370/325 |
| 5,708,972 | A | * | 1/1998 | Matsumoto | 455/517 |
| 5,774,795 | A | * | 6/1998 | Ando | 455/106 |
| 6,272,117 | B1 | * | 8/2001 | Choi et al. | 370/330 |
| 6,278,883 | B1 | * | 8/2001 | Choi | 455/552.1 |
| 6,574,338 | B1 | * | 6/2003 | Sachdev | 380/212 |

* cited by examiner

*Primary Examiner*—Bing Q. Bui
(74) *Attorney, Agent, or Firm*—Alston & Bird LLP

(57) ABSTRACT

Apparatus, and an associated method, for a radio communication system. Asymmetrically positioned downlink data transmitting stations and uplink data receiving stations are positioned defining downlink service areas and uplink service areas. A mobile terminal, when positioned in the downlink service area, is able to receive high speed downlink data. And, when the mobile terminal is stationed within an uplink service area, the mobile terminal is capable of sending data at high data rates to an uplink receiving station.

20 Claims, 4 Drawing Sheets

ASYMMETRIC RADIO ACCESS NETWORK, AND ASSOCIATED METHOD, FOR COMMUNICATING DATA AT HIGH DATA RATES

The present invention relates generally to the communication of data at high data rates in a radio communication system. More particularly, the present invention relates to apparatus, and an associated method, by which to provide for the communication of high-speed, uplink data from a mobile, or other data, terminal, to the network of a radio communication system at high data rates.

Communication of the data at high data rates is provided without necessitating a corresponding increase in power levels at which the uplink data would conventionally otherwise need to be communicated. Radio network infrastructure is provided that utilizes separate downlink transmitting stations and uplink receiving stations through which asymmetrically to communicate the downlink and uplink data. Uplink receiving stations define uplink service areas and are positioned at locations to permit detection of uplink data transmitted at power levels less than the power levels at which downlink data is communicated and the power levels at which uplink data is communicated in the conventional symmetric communication link configuration of uplink and downlink. The uplink receiving stations are positioned to permit their detection of the uplink data generated at a data terminal when the data terminal is positioned within an uplink service area associated therewith. And, the data terminal is capable of receiving downlink data when positioned within a downlink service area associated therewith. Two-way communication of data at high data rates is thereby permitted by way of a data terminal.

BACKGROUND OF THE INVENTION

A communication system permits data to be communicated between separate communication stations, formed, at a minimum, of a sending station and a receiving station. The use of a communication system by which to communicate data is, and shall likely continue increasingly to be, a necessary aspect of modern society. A wide variety of communication systems have been developed and are utilized regularly through which to effectuate many different types of communication services.

Technological advancements, such as advancements in communication technologies, have been implemented in communication systems. Improvements to existing types of communication systems as well as the implementation of new types of communication systems have been made possible as a result of such advancements in technologies.

Radio communication systems are exemplary of communication systems in which technological advancements have been implemented. In a radio communication system, communication channels are defined upon radio links formed between the communication stations thereof. The need otherwise to utilize wirelines to interconnect the communication stations is obviated. Radio communication systems are therefore amenable for implementation as mobile communication systems.

A cellular communication system is a type of radio communication system. Voice, as well as data, communication services are effectable through the use of a cellular communication system. Access to use of a cellular communication system is generally provided pursuant to a subscription for service therein. In some areas, use of cellular communication systems is increasingly becoming a primary manner by which to communicate telephonically. And, as cellular communication systems increasingly are constructed to permit the communication of increased amounts of data at increasingly high data rates, data-intensive communication services are also increasingly effectuated through the use of a cellular communication system.

Successive generations of cellular communication systems have been developed and implemented. And, successor-generation communication systems are undergoing development that takes advantage of technological advancements in communication technologies. While initial-generation, cellular communication systems provide for limited data services, third-generation and successor-generation communication systems are anticipated to be used, in significant part, to perform data communication services. Various standard-setting bodies are promulgating operational specifications that define the parameters of operation of such successor-generation systems. When data is communicated at high data rates with high user penetration levels, carrier frequencies of higher frequency levels or wider-spectrum bandwidths are required to permit the data to be communicated at the high data rates.

Various problems must, however, be overcome when the higher carrier frequencies and wider-spectrum bandwidths are utilized. Amongst the problems associated with communications at the higher-carrier frequencies and wider-spectrum bandwidths is that transmitted signals exhibit higher levels of propagation loss as well as higher levels of residual noise. Conventionally, compensation is made for the higher propagation loss and higher noise level by increasing the output power of the transmitted signal.

Increase in the output power level of the transmit signal is, however, practically limited. For instance, when the communication station from which the data is to be communicated is powered by a portable power supply, of limited energy storage capacity, increased power output requirements increase the speed at which the battery power supply becomes depleted of stored energy.

While communication services that are communicated at high data rates are conventionally contemplated to be originated at a network part of a communication system, proposed, communication services of successor-generation systems shall likely also be originated at mobile, or data, terminals that are powered by the portable battery power supplies of the limited energy storage capacities. Problems associated with originating data at a mobile, or other data, terminal, powered by a portable power supply, and transmitting the data as uplink data from the data terminal to the network part of the communication system remain to be considered and overcome.

More particularly, a manner is required by which to provide for the communication of uplink data, at high data rates, from a data terminal at power levels that are less than a selected, maximum power level. Communication of the data at the high data rates without a corresponding increase in the power levels at which the data is communicated permits communication services that must be performed at high data rates to be effectuated without a corresponding quick depletion of the stored energy of a battery power supply that powers the data terminal.

It is in light of this background information related to communication of data at high data rates in a radio communication system that the significant improvements of the present invention have evolved.

SUMMARY OF THE INVENTION

The present invention, accordingly, advantageously provides apparatus, and an associated method, by which to communicate data at high data rates in a radio communication system, such as a mobile communication system that utilizes mobile terminals powered by battery power supplies.

Through operation of an embodiment of the present invention, a manner is provided by which to provide for the communication of uplink data, at high data rates, from a mobile, or other data terminal to the network of a radio communication system.

In one aspect of the present invention, communication of the uplink data, at high data rates, is provided without necessitating a corresponding increase in the power levels at which the data is communicated. Because the power levels are not substantially increased, the rates at which stored energy, stored at a battery power supply that powers a data terminal at which the uplink data originates is not depleted at a rate significantly greater than the depletion rate at which the battery power supply would otherwise be depleted during conventional operation of the data terminal.

A radio network infrastructure architecture is provided to permit the communication of the uplink data at the high data rates without significant increase in the power levels at which the data must be communicated. The radio network infrastructure architecture utilizes separate downlink transmitting stations and uplink receiving stations. A downlink transmitting station defines a downlink service area, or cell. And, an uplink receiving stations defines an uplink service area, or cell. A downlink transmitting station operates to transit downlink data to effectuate a communication service to a mobile, or other data, terminal when the data terminal is positioned at a location encompassed by the downlink service area of the downlink transmitting station. And, the uplink receiving station operates to detect uplink data sent by a mobile, or other data, terminal when the data terminal is positioned in an uplink service area encompassed by the uplink receiving station. Because the separate downlink transmitting and uplink receiving stations are utilized, such stations need not be co-located or be of the same number. That is to say, the downlink transmitting and uplink receiving stations are positionable, as needed, to perform their respective functions to transmit, and to receive, data, communicated at high data rates, with a mobile, or other data, terminal.

In another aspect of the present invention, greater numbers of uplink receiving stations than downlink transmitting stations are utilized to form the radio network infrastructure of the communication system. Downlink transmitting stations are positioned in manners analogous to the positioning of base transceiver stations of a conventional cellular communication system. The downlink service area is defined by the downlink transmitting stations are of configurations generally analogous to the configurations cells defined by the base transceiver stations configured in a conventional cellular communication system. Uplink receiving stations are positioned at locations encompassed by the downlink service areas defined by the downlink transmitting stations. The uplink receiving stations are positioned, for example, to define uplink service areas that encompass areas at which uplink data is expected to be communicated at the high data rates pursuant to high data rate communication services. Multiple numbers of uplink receiving stations are, for instance, within a single downlink service area defined by a single downlink transmitting station. And, the uplink service areas at least partially overlap with the downlink service area within which the uplink receiving stations are positioned.

In another aspect of the present invention, directional antenna assemblies are utilized by the downlink transmitting stations to facilitate communication downlink data to a data terminal to which downlink data is communicated. Additionally, control information is communicated by the downlink transmitting station to each of the one or more uplink receiving stations positioned within the downlink service area defined by the downlink transmitting station. The directional antenna assembly also operates to form an antenna beam configuration to facilitate the communication of the control information to the uplink receiving station.

The data terminal also includes a directional antenna assembly to facilitate reception of downlink data transmitted thereto by the transmitting station and also to transmit uplink data to an uplink receiving station. As the position of the data terminal changes, the antenna beam pattern configuration caused to be exhibited by the antenna beam pattern of the antenna assembly correspondingly changes. Thereby, detection of downlink data transmitted to the data terminal is facilitated. And, communication of uplink data by the data terminal to an uplink data receiving station is also facilitated.

In another aspect of the present invention, a time-division duplexing (TDD) communication scheme is utilized by which to transmit the downlink data to a data terminal and to send uplink data from the data terminal to the uplink data receiving station. Timing synchronization is effectuated between the downlink transmitting station and the data terminal, and between the downlink transmitting station and the uplink receiving station, thereby to synchronize the communication stations of the radio communication system, permitting the time-duplexed communication of downlink and uplink data.

A radio communication architecture is provided thereby that facilitates very high speed, uplink rate services at mobile, or other data, terminal output power levels in a cellular-based communication system utilizing constituent sub-systems, receiving sub-systems, and mobile terminals utilizing time division duplexing or frequency division duplexing.

In these and other aspects, therefore, apparatus, and an associated method, is provided for a radio communication system. Downlink data is selectably communicated upon a downlink by a radio network at a first power level to a data terminal. And, uplink data is selectably communicated by the data terminal at a second power level to the radio network. The first power level is greater than the second power level. Communications in the radio communication system are facilitated. A downlink transmitting station defines a downlink service area. The downlink transmitting station selectably transmits the downlink data to the data terminal when the data terminal is positioned within the downlink service area. At least a first uplink receiving station defines at least a first uplink service area. The uplink receiving station receives the uplink data transmitted by the data terminal when the data terminal is positioned within the first uplink service area. The first uplink service area is of a size smaller than the downlink service area defined by the downlink transmitting station. And, the first uplink service area at least partially overlaps with the downlink service area.

A more complete appreciation of the present invention and the scope thereof can be obtained from the accompanying drawings that are briefly summarized below, the following descriptions of the presently preferred embodiments of the invention, and the appended claims.

DETAILED DESCRIPTION

Figure 1:
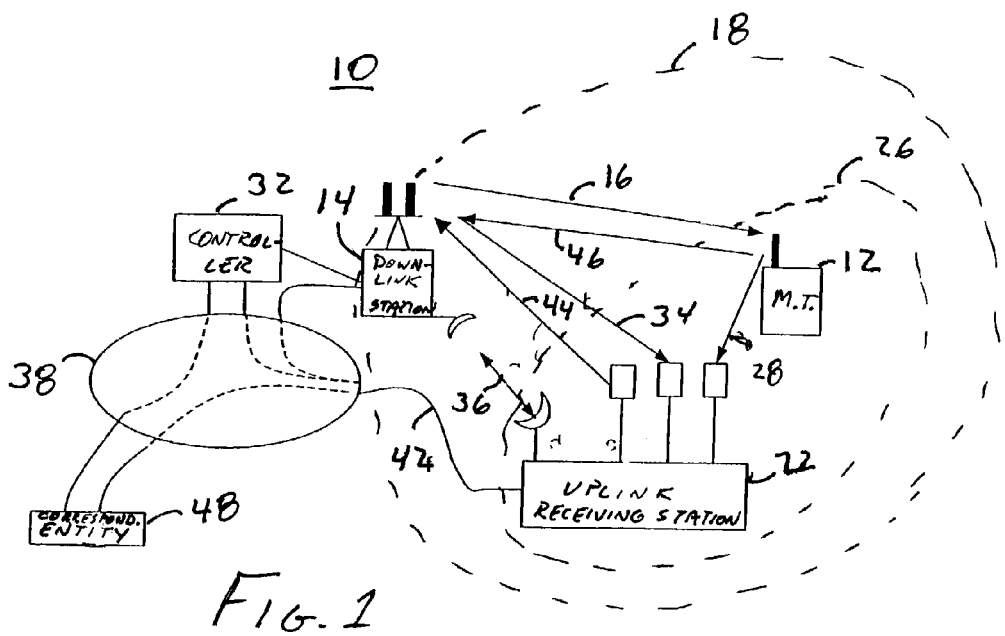
FIG. 1 illustrates a functional block diagram of a radio communication system operable pursuant to an embodiment of the present invention.

Referring first to FIG. 1, a radio communication system, shown generally at 10, provides for the communication of data at high data rates to effectuate communication services. Because the data is capable of communication at high speeds, i.e., at high data rates, data-intensive communication services are effectuable by way of the communication system 10.

While the following description of the exemplary implementation of the radio communication system is described to be a mobile communication system, such as a cellular communication system, the radio communication system is also representative of other types of radio communication systems in which data is to be communicated at high data rates. Therefore, while the following description of exemplary operation of the radio communication system shall be described with respect to its implementation as a cellular communication system, it should be understood that the teachings of the present invention are applicable to other types of radio communication systems, mobile systems as well as fixed-radio-access radio systems.

Communication of data is effectuated with a mobile data terminal. The mobile terminal forms a two-way radio transceiver capable of both receiving downlink data communicated thereto and transmitting uplink data sourced thereat.

The radio communication system includes a network part, here including a downlink transmitting station 14. The downlink transmitting station operates to send downlink data upon downlink channels defined upon a downlink formed between the downlink transmitting station and the mobile terminal. The transmission of the downlink data is indicated in the Figure by the segment 16. The downlink transmitting station defines a downlink service area 18. The dimensions of the downlink service area are dependent, in part, upon the power levels at which the downlink data is transmitted by the downlink transmitting station 14. In the exemplary implementation, the downlink transmitting station forms a fixed-site communication station, analogous to, or forming a, base transceiver station of a cellular communication system. A single downlink transmitting station is shown for purposes of illustration. In an actual radio communication system, a plurality of downlink transmitting stations are positioned to encompass a geographical area, each downlink transmitting station defining a separate downlink service area.

The network part of the radio communication system also includes uplink receiving stations, of which the uplink receiving station 22 is representative. The uplink receiving station operates to receive uplink data generated by a data terminal, such as the mobile terminal 12, when the data terminal is positioned within an uplink service area defined by the uplink receiving station. When the mobile terminal 12 is positioned within the uplink service area 26, uplink data, originated at the mobile terminal and transmitted upon uplink channels defined upon an uplink formed between the mobile terminal and the uplink receiving station is detected at the receiving station 22. The segment 28 is representative of the transmission of the uplink data by the mobile terminal to the uplink receiving station. For purposes of illustration, a single uplink receiving station is shown in the Figure. In an actual implementation, additional uplink receiving stations are utilized. For instance, several uplink receiving stations are positionable within the downlink service area 18 defined by a single downlink transmitting station. Each of the uplink receiving stations defines a separate uplink service area 26, permitting detection, and operation upon, uplink data communicated by the mobile terminal when the mobile terminal is positioned in an area encompassed by the respective uplink service areas. The asymmetric arrangement of the downlink transmitting and uplink receiving stations permits the uplink data to be communicated at power levels that are less than the power levels at which the downlink data is transmitted by the downlink transmitting stations and also, that are less than the power levels at which the uplink data is transmitted by the mobile terminal in the conventional symmetric communication link configuration of uplink and downlink. Through appropriate positioning of the uplink receiving stations, a manner is thereby provided by which to permit the communication of uplink data to effectuate high data rate communication services from the mobile terminal.

Additional communications are effectuated during operation of the radio communication system. A controller 32 further forms a portion of the radio communication system. The controller 32 controls operations of the downlink transmitting station and uplink receiving station, e.g., to place, and maintain, the respective stations in time synchronization with one another. The controller 32 is here coupled to the downlink transmitting station and, for example, is embodied therewith.

The control information is sent to the uplink receiving station in any of various manners. For instance, the transmitting station, in one implementation, sends the control information to the uplink receiving station upon downlink channels defined upon a downlink formed therebetween. Communication of the control information in this manner is represented by the segment 34. Or, in another implementation, a dedicated radio link is formed between the communication stations 14 and 22. The dedicated radio link is represented in the Figure by the segment 36. Or, in another implementation, the control information is communicated to the uplink receiving station by way of wireline connections formed therebetween. Wireline connections are effectuated, for instance, by way of a packet-switched network 38 to which the uplink receiving station is coupled, here indicated by the line 42. And, control information is also communicated by the uplink receiving station to the downlink transmitting station in a similar manner. That is to say, control information is communicated, in various implementations, by way of the wireline connection, the radio link, or an uplink channel defined upon an uplink formed between the receiving and transmitting stations. The segment 44 is here representative of the communication of control information upon an uplink channel defined upon an uplink formed between the communication stations. And, when the transmitting station operates analogous to, or forms, a base transceiver station, uplink information, at conventional data rates, such as control information, is communicated by the mobile terminal to the downlink transmitting station. Such communication is indicated in the Figure by the segment 46.

A correspondent entity 48 is also shown in the Figure. The correspondent entity is representative of a data source, or data destination, at which the high speed data is ultimately sourced or terminated. The correspondent entity is representative of any of a variety of devices, such as a data server.

Figure 2:
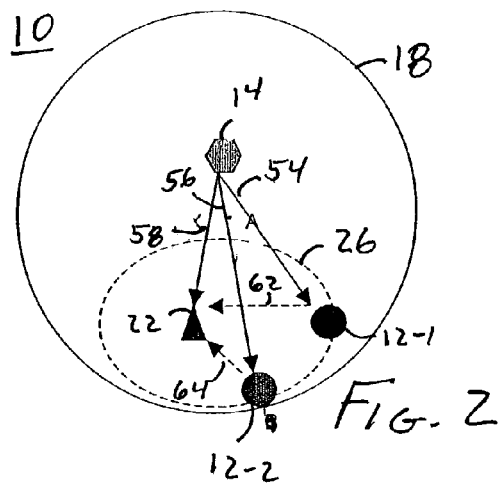
FIG. 2 illustrates a functional representation of exemplary positioning of elements of the radio communication system shown in FIG. 1.

FIG. 2 illustrates again the radio communication system 10 that provides for the communication of both downlink and uplink data at high data rates. Again, the downlink transmitting station 14 defines a downlink service area 18. And, an uplink receiving station 22 defines an uplink service area. Here, two separate mobile terminals, mobile terminals 12-1 and 12-2, are positioned within both of the service areas 18 and 26. Through the use of directional antenna beam configurations, formed by a directional antenna assembly of the downlink transmitting station, separate signals are communicated to the separate elements 12-1, 12-2, and 22. The segments 54, 56, and 58 represent the separate communications to such elements. And, the segments 62 and 64, shown in dash, are representative of uplink data by the respective ones of the mobile terminals to the uplink receiving station 22.

Figure 3:
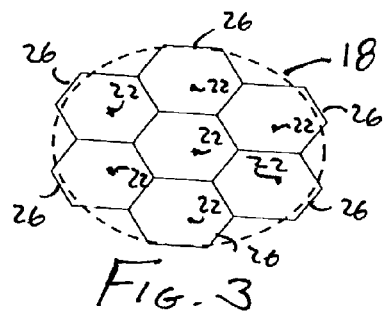
FIGS. 3, 4, and 5 illustrate exemplary arrangements of uplink service areas together with downlink service areas defined in exemplary implementations of the radio communication system containing the elements shown in FIG. 1.

FIG. 3 illustrates an exemplary arrangement of uplink receiving stations 22 and uplink service areas 26 associated therewith. The uplink receiving stations are positioned such that the uplink service areas associated, respectively, therewith together substantially overlap the downlink service 18 defined by a single downlink transmitting station. The ratio of uplink receiving stations to downlink transmitting stations is a ratio of 7:1. That is to say, the downlink service area substantially corresponds to the aggregated uplink service areas.

Figure 4:
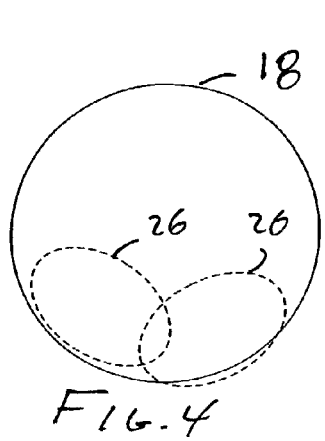
Figure 5:
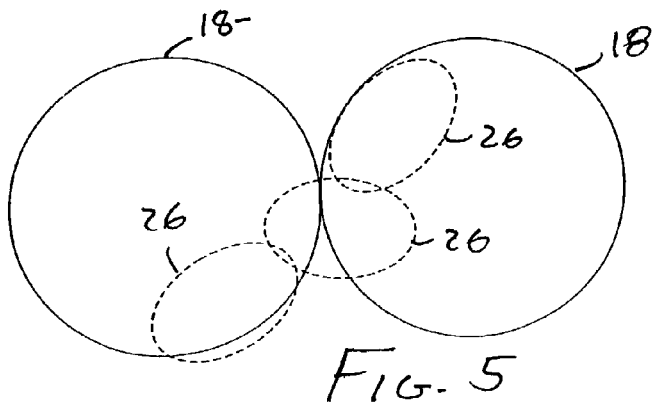

FIGS. 4 and 5 illustrate other exemplary relationships between the downlink service area 18 and uplink service areas 26 in two other implementations. In the implementation shown in FIG. 4, the service areas of two consecutive, uplink service areas 26 are overlaid upon the downlink service area. And, in the arrangement shown in FIG. 5, two downlink service areas are shown. And, three uplink service areas 26 are shown. One of the uplink service areas 26 is overlaid upon portions of separate ones of the downlink service areas. That is to say, the uplink service area bridges the downlink service areas.

Analysis of FIGS. 3, 4, an 5 indicates that the positioning of the uplink receiving stations is flexible, thereby to accommodate traffic conditions, as needed, to permit the effectuation of very high speed data rate uplink services at specific locations, such as at convention venues, festivals, carnivals, athletic fields, or the like. Because of the relatively small dimensions of the uplink service areas, design constraints less likely include radio path interference induced upon neighboring cells. And, the positioning of the uplink receiving stations is changeable if communication conditions warrant alteration of the uplink service areas. If positioned in an urban area, existing high-speed infrastructure, such as optical fiber, coaxial cables, or wireless point-to-point links are generally available to form interfaces with the uplink receiving stations when positioned, or re-positioned.

Figure 6:
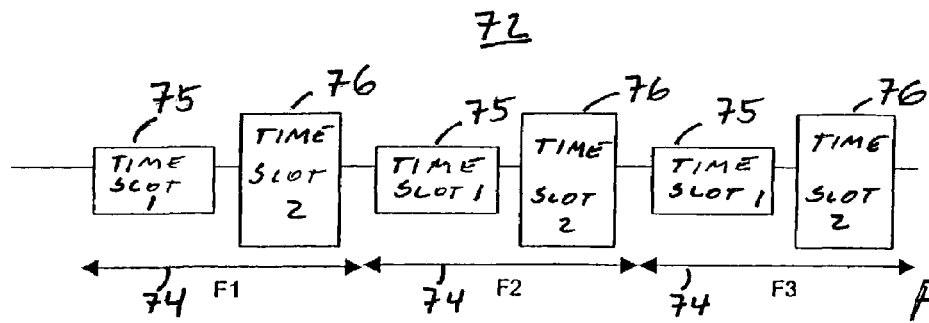
FIG. 6 illustrates time slots defined in an exemplary, time-division-duplex communication scheme pursuant to which communications are effectuated in an exemplary embodiment of the present invention.

FIG. 6 illustrates a timing scheme, shown generally at 72, used during operation of the radio communication system 10 of the exemplary implementation. The timing scheme utilizes a time-division-duplex (TDD) scheme. Frames 74, here designated at F1, F2, and F3, are of fixed-lengths, and, time slots 75 are used upon which to transmit downlink data. Time slots 76 form uplink slots that are used within which to communicate uplink data. Timing synchronization is important so that a mobile terminal, used in a TDD mode, does not cause collisions of uplink and downlink data. And, additionally, an uplink receiving station operates to receive both uplink data communicated by a mobile data terminal as well as downlink signals, such as control information, transmitted by a downlink transmitting station. Timing synchronization is also required of the uplink receiving station so that the time division duplex scheme operates acceptably. In the exemplary implementation, a downlink signal originated at the downlink transmitting station is used as a reference for timing purposes by the uplink receiving station. And, the downlink signal is also used by a mobile data terminal, thereby to maintain the mobile terminal and the uplink receiving station in time synchronization.

Figure 7:
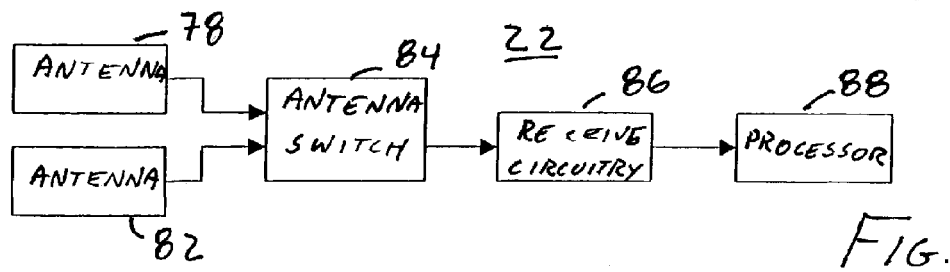
FIG. 7 illustrates a functional block diagram of an exemplary, uplink receiving station forming part of the radio communication system shown in FIG. 1.

FIG. 7 illustrates the architecture of an exemplary uplink data receiving station 22 of an embodiment of the present invention. The uplink receiving station includes two separate antennas, here antennas 78 and 82. The antennas 78 and 82 are coupled to an antenna selection switch 84 that switchingly connects one, or the other, of the antennas to receive circuitry 86. A processor 88 is coupled to the receive circuitry. The receive circuitry operates, amongst other things, to perform down conversion operations to place the signals detected by the antennas 78 and 82 in form for demodulation processing or other signal processing, by the processor 88.

The antenna 78 is of configuration and properties that facilitates detection of signals generated by the downlink transmitting station, such as control information, sent by the transmitting station to synchronize the uplink data receiving station. And, the antenna 82 is of dimensions and configuration to facilitate detection of uplink signals generated by a data terminal containing uplink data, communicated at high data rates, to the uplink data receiving station. Operation of the antenna switch 84 connects one, or the other, of the antennas to the receive circuitry 86, with switching performed according to the timing scheme that is utilized, such as the time division duplex scheme shown in FIG. 6.

Figure 8:
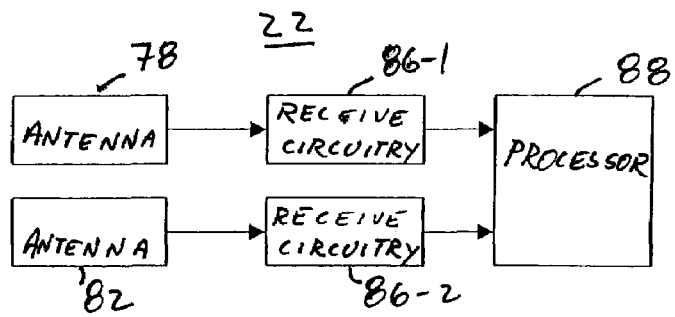
FIG. 8 illustrates a functional block diagram, similar to that shown in FIG. 7, but here of another embodiment of the present invention.

FIG. 8 illustrates an uplink data receiving station 22 of an alternate embodiment of the present invention. Here, the receiving station again includes antennas 78 and 82. The use of an antenna switch is obviated. Instead, separate receive circuits, here shown at 86-1 and 86-2, are coupled to the antennas 78 and 82, respectively. And, the receive circuits are coupled to a processor 88. The processor 88 is implemented, for instance, as a digital signal processor, or as a configurable processor. And, the processor 88 is also implementable as a multi-mode processor.

Figure 9:
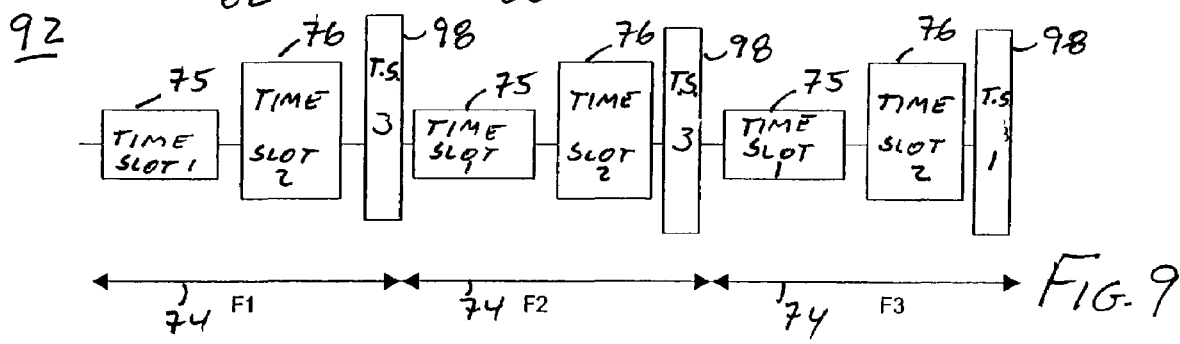
FIG. 9 illustrates a representation, similar to that shown in FIG. 6, here illustrating time slots utilized to send control information during operation of the radio communication system shown in FIG. 1.

FIG. 9 illustrates another timing scheme, shown generally at 92, utilized in another embodiment of the present invention. The timing scheme also forms a TDD (time division duplex) scheme in which frames 74 are defined. Time slots are defined within the frames. And, again, the time slots include time slots 75 and 76. Additional time slots 98 are also defined in each of the frames 74. The time slot 98 is used upon which to communicate uplink signals by the uplink receiving station to a downlink transmitting station. A control signal or a data signal is communicated during such time slots. Multi-level modulation is, for instance, utilized to form the uplink signals when the radio transmission path is stable.

Figure 10:
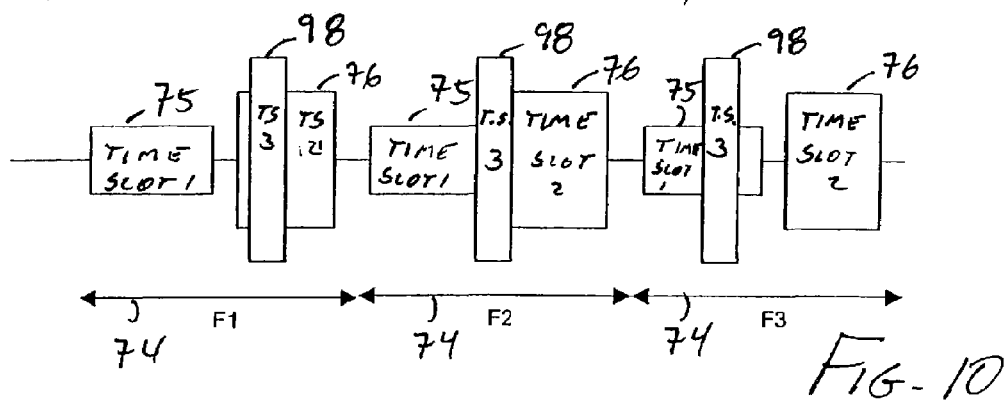
FIG. 10 illustrates a representation, similar to that shown in FIG. 9, but here illustrating another arrangement of time slots including time slots used upon which to communicate control information.

FIG. 10 illustrates another exemplary timing scheme, here shown at 96. Again, time frames 74 are defined, and time slots 75 and 76 are also defined. Time slots 98 here overlap with other time slots such that signals are concurrently transmitted upon the separate time slots. That is to say, uplink control signals are generated during the time slots 98, simultaneous to communication of uplink data during the time slots 76. In this implementation, at the uplink data receiving station, antenna apparatus is of a configuration that permits the detection, and communication, of the respective signals. Sufficient levels of isolation at the antenna assembly are required for communication, and detection, of such signals.

The third frame 74, designated F3 in the Figure, illustrates an implementation in which the uplink control signals, transmitted during the time slot 98, are transmitted simultaneous to the transmission of the downlink data during the time slot 75. In such an implementation, a downlink receiving antenna assembly, positioned at the uplink receiving station, is directed towards the downlink transmitting station. When separate sub-assemblies are used to send data and to receive data, the isolation between such sub-assemblies is again great enough to ensure adequate communication of both communications.

Additionally, at the downlink transmitting station, receive paths between the downlink transmit signals sent to data terminals and to the uplink receiving stations and receiving paths for receiving uplink controls transmitted by the uplink data receiving station are installed to ensure that the downlink data transmitting station exhibits sufficient isolation to communicate both types of data.

Additionally, the antenna assembly of the uplink data receiving station is installed in a manner to avoid, or otherwise minimize, interference of uplink signals communicated by the uplink data receiving station with uplink data received by the mobile terminals. Antenna assemblies capable of forming pencil beams, i.e., narrow lobe antenna patterns, are advantageously used for the communication of downlink signals by the downlink transmitting station to the uplink data receiving station and also for the communication of uplink signals to the downlink data transmitting station. Use of such antenna beam configurations better ensures isolation between the separate links, as both of the separate links are, for instance, point-to-point radio links in a stable transmission environment.

The frame 74 designated at F2 in FIG. 10, illustrates an implementation in which uplink control signals, generated by an uplink data receiving station, for communication to a downlink transmitting station, are transmitted simultaneously with the uplink data communicated by the mobile data terminal, and the downlink data transmitted by the downlink transmitting station for reception at the uplink data receiving station. Again, appropriate levels of isolation are maintained to ensure that the signals are successfully communicated.

Figures 11, 12:
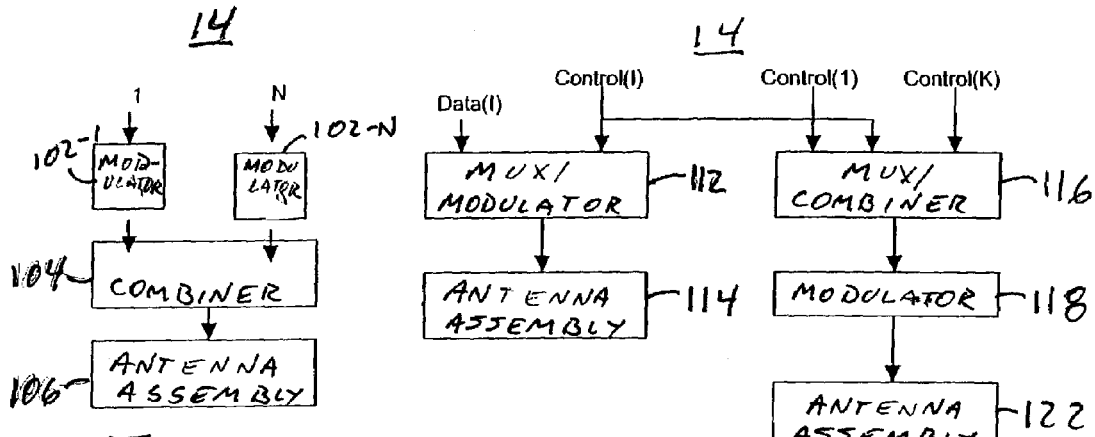
FIG. 11 illustrates a functional block diagram of a downlink transmitting station of an embodiment of the present invention that forms part of the radio communication system shown in FIG. 1.
FIG. 12 illustrates a functional block diagram, similar to that shown in FIG. 11, but here representative of a downlink transmitting station of an embodiment of the present invention.

The downlink transmitting station 14, shown in FIG. 11, is shown to include separate modulators 102-1 through 102-N, separately operable to modulate downlink data for communication to N mobile terminals. Modulated signals generated by the separate modulators are combined by a combiner 104. And, once combined, the modulated signals are applied to a fan beam antenna assembly. Power amplifiers, not shown, are also utilized at the downlink transmitting station, positioned between the modulators and the combiner or positioned between the combiner and the antenna assembly. In another implementation, group modulators are used in substitution for the individual modulators 102.

Formation of a fan beam by the antenna assembly 106 permits downlink data to be communicated, not only to the mobile data terminals, but also to the uplink data receiving station. Downlink signals are provided to the uplink receiving station to facilitate the efficiency by which the uplink data, originated at the mobile terminal, is communicated to the uplink data receiving station. Control information is also extracted from data communicated by the downlink transmitting station, existing in the service area of the uplink data receiving station. When the corresponding fan beam assembly 106 is used by the downlink transmitting station, the uplink data receiving station receives the same downlink signal that the mobile terminals receive.

A downlink transmitting station 14 of another implementation is shown in FIG. 12. Here, separate pencil beams of antenna assemblies are dedicated for transmissions to separate ones of the mobile terminals and uplink data receiving station data, or control information, that is to be communicated. The data payloads of downlink signals dedicated for uplink receiving stations are established by making use of downlink frequency channels, specifically in the aggregation of downlink control signals.

Dedicated signals to a mobile terminal comprising information data (I) and control (I) data are supplied to a multiplexer/modulator 112 and to a dedicated pencil beam, antenna assembly 114. At the same time, control data control(I) to be communicated to the mobile terminal (I) is supplied to a combiner/multiplexer 116. Other control data (1) through (K) is also multiplexed and combined thereat. Mobile terminals 1-K are presumed to reside in the service area of the uplink service area associated with the uplink receiving station.

The multiplexer/combiner 116 generates multiplexed and combined signals that are supplied to a modulator 118 and then to a pencil beam antenna assembly 122 that directs the modulated signal to the uplink data receiving station by way of a power amplifier (not separately shown). In this implementation, the carrier for the signals is selected amongst the carriers allocated for communications with the mobile terminals, i.e., downlink carriers. Accordingly, the uplink data receiving station is able to monitor the downlink control signals for each mobile terminal and extract the information therefrom. The uplink data receiving station is able to use the control information to facilitate reception of the uplink data communicated by individual ones of the mobile terminals.

In another implementation, a combination of a fan beam/sector beam and pencil beams is used. If an uplink data receiving station is not covered by a fan beam service area formed by a fan beam exhibited by the antenna pattern of a fan beam antenna assembly of a downlink transmitting station, dedicated pencil beams are formed by which to communicate information with the uplink data receiving station. Thereby, an uplink receiving station is able to receive uplink data communicated by data terminals thereto and also to interface with a transmitting station, or other external network.

Figure 13:
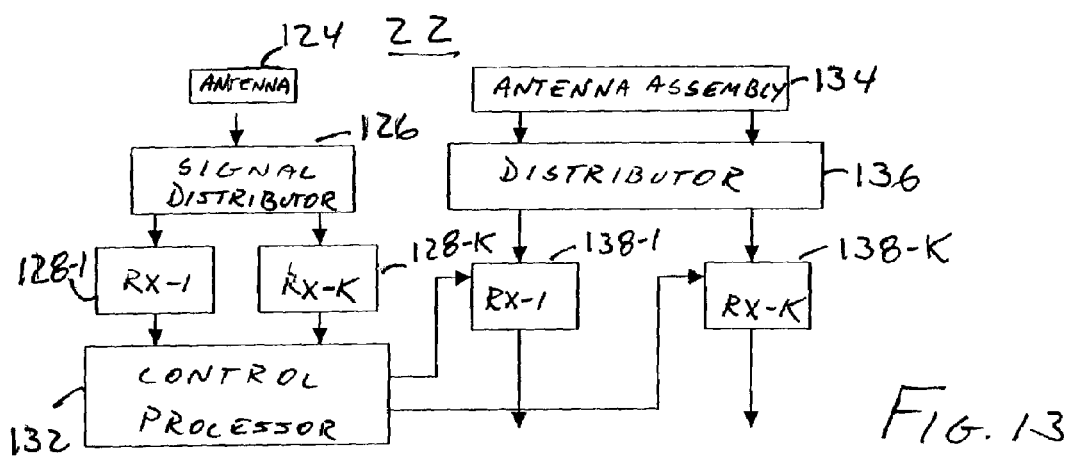
FIG. 13 illustrates a functional block diagram of an uplink receiving station of an exemplary embodiment of the present invention that forms a portion of the radio communication system shown in FIG. 1.

FIG. 13 illustrates another implementation of an uplink data receiving station of an embodiment of the present invention. In this implementation, fan beam configurations are formed by antenna apparatus of a downlink transmitting station pursuant to communication operations in the communication system of which the uplink data receiving station forms a portion.

Here, a downlink receive antenna assembly 124 operates to detect downlink signals transmitted by a downlink transmitting station thereto. A signal distributor 126 is coupled to the antenna assembly and operates to divide the received signals into K signals. And, the K signals are applied to individual receivers 128-1 through 128-K. The receivers correspond to the K multiplexed downlink signals. The received and de-modulated K signals are provided to a control processor 132. Or, in another implementation, a common receiver is used instead of the separate receivers 128-1 through 128-K. The uplink receiving station further includes elements permitting the receiving station to receive and operate upon uplink data communicated thereto by mobile terminals. The uplink data is detected by antennas of an antenna assembly 134. The antenna beam characteristics exhibited by the antenna assembly is selectable, formed, for instance, of an omnidirectional configuration or sectorized configuration. The configurations are fixed or adaptable, as desired. Detected uplink data, detected by the antenna assembly, is provided to a distributor 136. The distributor 136 distributes the detected data K receivers 138-1 through 138-K.

Reception of the uplink data at the individual ones of the receivers 138 is controlled by control signals generated by the processor 132. The control signals include information dealing with the individual ones of the K uplink data signals obtained from the downlink signals generated by a downlink transmitting station and communicated to the uplink receiving station.

Figure 14:
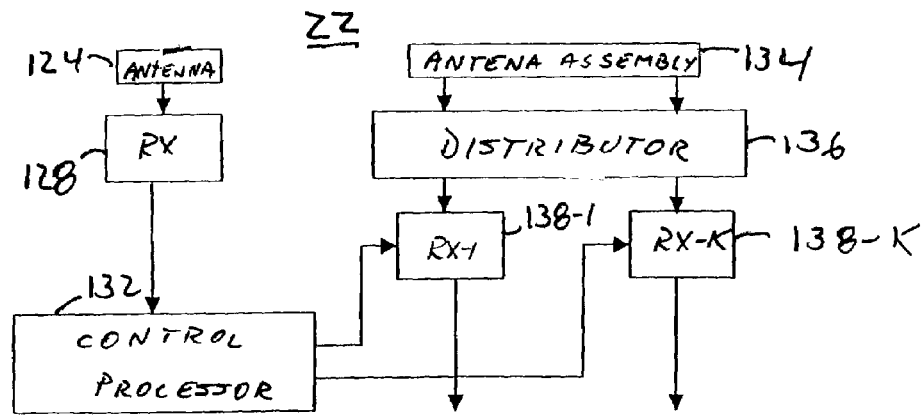
FIG. 14 illustrates a functional block diagram, similar to that shown in FIG. 13, but here of another embodiment of the present invention.

FIG. 14 illustrates an uplink receiving station 22 of another implementation. Here, a receiver architecture is provided in which pencil beams are utilized for payload as dedicated signals to individual mobile terminals and uplink data receiving stations. Here, the uplink data receiving station includes a single receiver 128. Other elements shown in FIG. 14 correspond with corresponding elements shown in FIG. 13 and shall not separately again be described.

Figure 15:
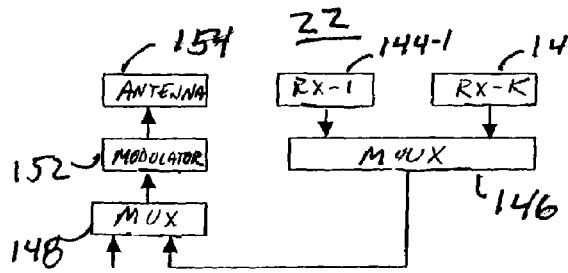
FIG. 15 illustrates a functional block diagram of a portion an uplink, receiving station of an embodiment of the present invention that forms parts of the radio communication system shown in FIG. 1.

FIG. 15 illustrates a representation of a portion of an uplink data receiving station of another embodiment of the present invention. Because of the asymmetrical nature of the communication system, a downlink transmitting station and an uplink receiving station is not necessarily co-located. A manner is required, therefore, to provide uplink data received at an uplink data receiving station to a downlink data transmitting station and to external elements, such as the correspondent entity shown in FIG. 1. As noted briefly hereinabove, uplink air interface signal bandwidth is utilized to forward very high speed data delivered to the uplink receiving station to the downlink transmitting station. The radio link used for this uplink air interface is generally stable as both the transmitter and receiver are fixed, in contrast to other uplink signals generated by the mobile data terminals in which moving conditions and changing environments make the communications susceptible to fading and other distortion. For this transmission radio path, multi-level modulation is used. A higher SINR (signal to noise ratio) is required. But, a higher data rate is supported by aggregating multiple channels of uplink signals through the use of higher level modulation. Furthermore, the uplink data receiving station is capable of transmitting and receiving signals at the same time and at the same frequency with sufficient spatial isolation between them. Therefore, isolation of such signals is kept for proper operation.

In FIG. 15, uplink receivers 144-1 through 144-K receive uplink data communicated by mobile terminals. The antenna assembly of the receiving station 22 includes antenna assemblies analogous to the antenna assemblies forming parts of the receiving station shown in the embodiments of FIGS. 13 and 14 and are not again separately shown. The receive data is assembled at an uplink data multiplexer 146. And, multiplexed data is formed therefrom and provided to an uplink data forwarding multiplexer 148 that operates in conjunction with control from the uplink data receiving station for communication to the downlink transmitting station. Once multiplexed, the data is provided to an uplink modulator 152 and then provided to an uplink transmitting antenna assembly 154 to be transduced therefrom. In an alternate embodiment, the uplink air interface signal is taken for forwarding aggregated control signals of mobile terminals from the uplink data receiving station to the downlink data transmitting station and information data is forwarded in another manner.

Figure 16:
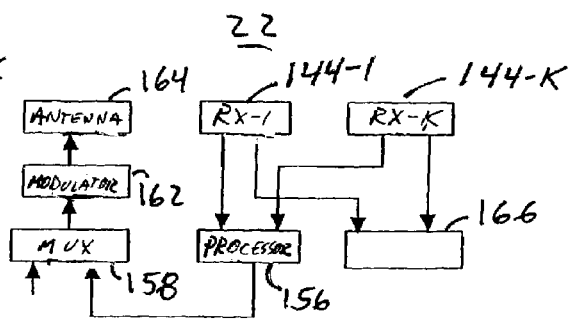
FIG. 16 illustrates a functional block diagram, similar to that shown in FIG. 15, but here of another embodiment of the present invention.

FIG. 16 illustrates such an embodiment of the uplink data receiving station. Again, the antenna assemblies are not shown in this Figure as such antenna assemblies correspond to those described previously with respect to the implementations shown in FIGS. 13 and 14. Again, a plurality of uplink receivers, again designated at 144-1 through 144-K receive uplink data generated by individual mobile data terminals and transmitted to the uplink receiving station. The receivers 144 and associated processing functions divide uplink data into two separate parts, one being control data to be forwarded to the downlink transmitting station after processing at the uplink data receiving station. And, another part is information data, i.e., high speed uplink data that is to be forwarded from the uplink receiving station in order to sustain a communication link. Control data is processed at the uplink data receiving station processor 156 and the required control data that is to be forwarded to the downlink data transmitting station is supplied to an uplink forwarding multiplexer 158 in conjunction with control data from the uplink data receiving station to the downlink data transmitting station. The multiplexed forwarding data is applied to a modulator 162 to an uplink transmitting antenna assembly 164 by way of a power amplifier.

Information data that is to be forwarded to recipient stations are forwarded by way of an interface circuit 166. Required processing functions are performed at the interface circuit, controlled by the downlink data transmitting station by way of downlinks, or dedicated links, such as wireline or wireless links. The information data that is to be forwarded to the outside recipients are processed and interfaced to the external network by way of the interface circuit. In the course of processing for the forwarding information data, a scheme such as a cell site diversity scheme is, for instance, implemented, as well as third-generation (3G) as well as existing systems. Control information regarding control processing is forwarded to the downlink data transmitting station as control information from the uplink data receiving station.

Figure 17:
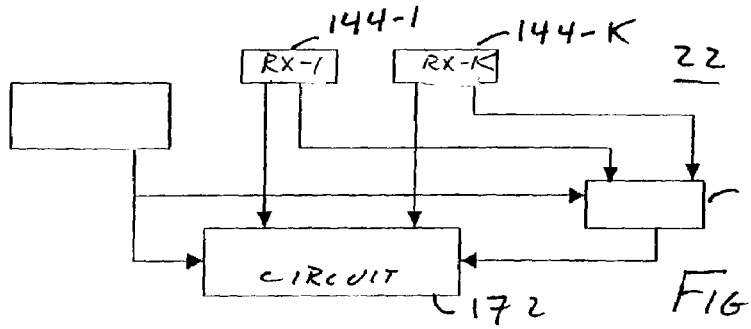
FIG. 17 illustrates a functional block diagram, similar to those shown in FIGS. 15 and 16, but here of another embodiment of the present invention.

FIG. 17 illustrates another implementation of the uplink data receiving station 22. Here, a dedicated link, such as a fixed wireless access (FWA) or a wireline connection, is used for aggregated uplink signals received at the uplink data receiving station for forwarding on to the downlink data transmitting station. Here, channels are not borrowed from the channels that would otherwise be allocated for mobile terminal uses. Uplink receivers 144-1 through 144-K again receive uplink data from the individual mobile terminals. The output data of such receivers is supplied to an output interface circuit 172. The circuit 172 is controlled by the downlink signal transmitted by the downlink transmitting station that is processed by the processor 174. Further, attribute information, in conjunction with the received uplink data transmitted by the individual mobile terminals is extracted in the uplink data processor 170 and then supplied to the circuit 172. The output interface circuit 172 establishes forward links using a dedicated wireless link or a wireline. In the course of processing for the forward information data, a scheme such as cell site diversity is implemented, as well as current third-generation systems. Control information regarding such control processing may be forwarded to the transmitting station as control information from the uplink data receiving station.

Figure 18:
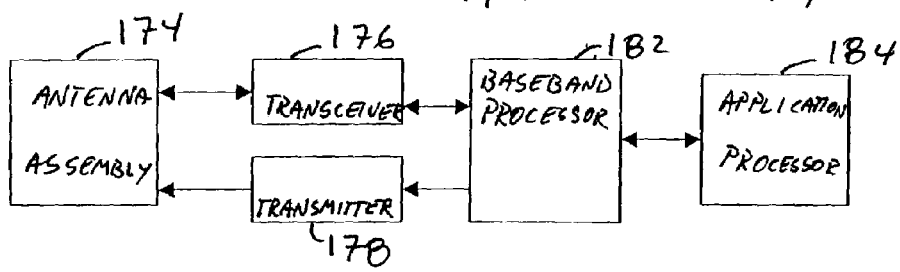
FIG. 18 illustrates a functional block diagram of a mobile, or other data, terminal that forms a portion of the radio communication system shown in FIG. 1.

FIG. 18 illustrates a mobile terminal 12, exemplary of a mobile terminal that operates in a radio communication system shown in FIG. 1. The mobile terminal includes an antenna assembly 174, a transceiver 176, a very high speed data uplink transmitter 178, a baseband processor 182, and an application processor 184. Additional elements of the mobile terminal are not shown for purposes of simplicity.

The application processor generates demand to use very high speed data uplink services, then the application processor 184 transmits the request for such service demand to a downlink transmitting station by way of a conventional radio link, e.g., a downlink signal or an uplink signal, by way of the baseband processor 182, the transceiver 176, and the antenna assembly 174.

If the mobile terminal resides within an uplink service area defined by an uplink data receiving station, then the downlink data transmitting station sends control data to establish very high speed data communication services for the mobile terminal as well as to the uplink data receiving station to which the mobile terminal is positioned. Thereby, the mobile terminal establishes a communication service link by which to communicate the data at the high data rates by way of the uplink transmitter 178 for communication to the uplink data receiving station.

The previous descriptions are of preferred examples for implementing the invention, and the scope of the invention should not necessarily be limited by this description. The scope of the present invention is defined by the following claims:

I claim:

1. In a radio communication system in which downlink data is selectably communicated upon a downlink by a radio network at a first power level to a data terminal and in which uplink data is selectably communicated by the data terminal at a second power level to the radio network, the first power level greater than the second power level, an improvement of apparatus for the radio network for facilitating communications in the radio communication system, said apparatus comprising:

a downlink transmitting station defining a downlink service area, said downlink transmitting station selectably for transmitting the downlink data to the data terminal when the data terminal is positioned within the downlink service area; and at least a first uplink receiving station separate from the downlink transmitting station and defining at least a first uplink service area, said uplink receiving station for receiving the uplink data transmitted by the data terminal when the data terminal is positioned within the first uplink service area, the first uplink service area of a size smaller than the downlink service area defined by said downlink transmitting station and at least partially overlapping therewith.

2. The apparatus of claim 1 wherein said at least the first uplink receiving station comprises the first uplink receiving station that defines the first uplink service area and at least a second uplink receiving station that defines a second uplink service area, the first uplink service area and the at least the second uplink service area together of a size smaller than the downlink service area.

3. The apparatus of claim 1 wherein said at least the first uplink receiving station is positioned within the downlink service area.

4. The apparatus of claim 1 further comprising a synchronizer, said synchronizer for synchronizer for synchronizing operation of said downlink transmitting station and said at least the first uplink receiving station.

5. The apparatus of claim 1 wherein said downlink transmitting station further comprises a directional antenna assembly capable of forming a directional antenna beam pattern, the directional antenna beam pattern selectable responsive to positioning of the data terminal.

6. The apparatus of claim 5 further comprising a controller coupled to said downlink transmitting station, said controller for controlling operation of said downlink transmitting station and said at least first uplink receiving station, control of said at least first uplink receiving station effectuated by way of control signals communicated to said at least first uplink receiving station by way of a radio control link, and wherein the directional antenna beam pattern formable by the directional antenna assembly selectably encompasses said at least first uplink receiving station.

7. The apparatus of claim 1 further comprising a controller coupled to said downlink transmitting station, said controller for controlling operation of said downlink transmitting station and said at least first uplink receiving station, control of said at least first uplink receiving station effectuated by way of control signals communicated to said at least first uplink receiving station effectuated by way of communication signals communicated to said at least first uplink receiving station by way of a control link.

8. The apparatus of claim 7 wherein the control link by way of which said controller effectuates control of said at least first uplink receiving station comprises a dedicated link formed between the downlink transmitting station and said at least first uplink receiving station.

9. The apparatus of claim 7 wherein the control signals communicated to said at least first communication station by said controller are communicated thereto prior to delivery of the uplink data thereto.

10. The apparatus of claim 1 wherein the radio communication system further defines a return-data path formable between said at least first uplink receiving station and said downlink transmitting station upon which to provide the uplink data received by said at least first uplink receiving station to said downlink transmitting station, said at least first uplink receiving station further comprising a return-data path communicator for providing the uplink data to said downlink transmitting station via the return-data path.

11. The apparatus of claim 1 wherein said at least first uplink receiving station is positionable at a first location such that the first uplink service area encompasses a first geographic area and is selectably repositionable at a second location such that the first uplink service area encompasses a second geographic area.

12. The apparatus of claim 1 wherein the radio communication system utilizes a time division duplexing scheme that defines a downlink channel and an uplink channel, wherein the downlink data communicated by said downlink transmitting station is communicated upon the downlink channel, and wherein the uplink data communicated by the data terminal to said first uplink receiving station is communicated upon the uplink channel.

13. The apparatus of claim 12 further comprising a controller coupled to said downlink transmitting station, said controller for controlling operation of said downlink transmitting station and said at least first uplink receiving station, control of said at least first uplink receiving station effectuated by way of control signals communicated to said at least first uplink receiving station, the time division duplexing scheme further defining control-downlink channel, wherein the control signals are communicated on the control-downlink channel.

14. The apparatus of claim 13 wherein said at least first uplink receiving station further provides uplink control information to said downlink transmitting station, and wherein the time division duplexing scheme further defines a control-uplink channel, the uplink control information communicated upon the control-uplink channel.

15. A method for communicating data between a radio network and a data terminal, said method comprising:

selectably transmitting downlink data at a downlink transmitting station to the data terminal from a downlink transmitting station, the downlink transmitting station forming part of the radio network and defining a downlink service area;

selectably transmitting uplink data from the data terminal to a first uplink receiving station being separate from the downlink transmitting station, the first uplink receiving station forming part of the radio network and defining a first uplink service area, the first uplink service area of a size smaller than the downlink service area defined by the downlink transmitting station from which the downlink data is selectably transmitted during said operation of selectably transmitting the downlink data, and the uplink service area at least partially overlapping the downlink service area.

16. The method of claim 15 wherein the first uplink receiving station to which the uplink data is selectably transmitted during said operation of selectably transmitting the uplink data is positioned within the downlink service area.

17. The method of claim 15 wherein the downlink transmitting station comprises a directional antenna assembly, and wherein said method further comprises the operation, prior to said operation of selectably transmitting the downlink data, of selecting beam configuration to be exhibited by the directional antenna assembly pursuant to transmission of the downlink data.

18. The method of claim 15 further comprising the operation of controlling operation of the downlink transmitting station and the uplink receiving station by a controller coupled to the downlink transmitting station.

19. The method of claim 18 wherein said operation of controlling further comprises sending control signals from the downlink transmitting station to the uplink receiving station by way of a control link.

20. The method of claim 19 wherein the control link upon which the control signals are sent during said operation of sending comprises a radio control link.

* * * * *